(No Model.)
J. A. OSTENBERG.
CONTINUOUS AUTOMATIC STARCH TABLE.
No. 447,790. Patented Mar. 10, 1891.
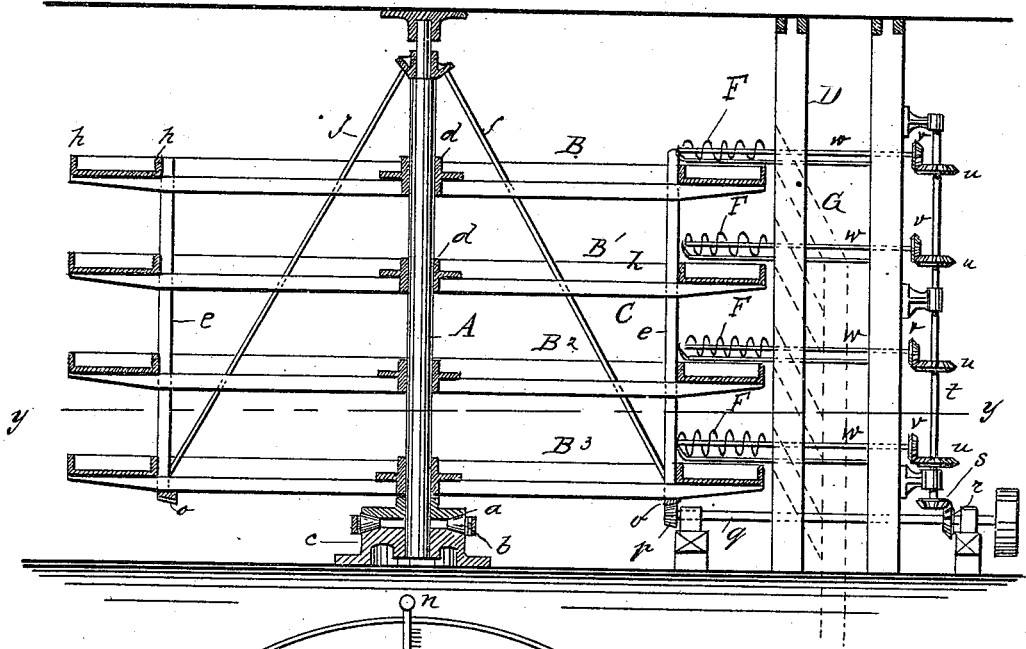
Fig. 1.
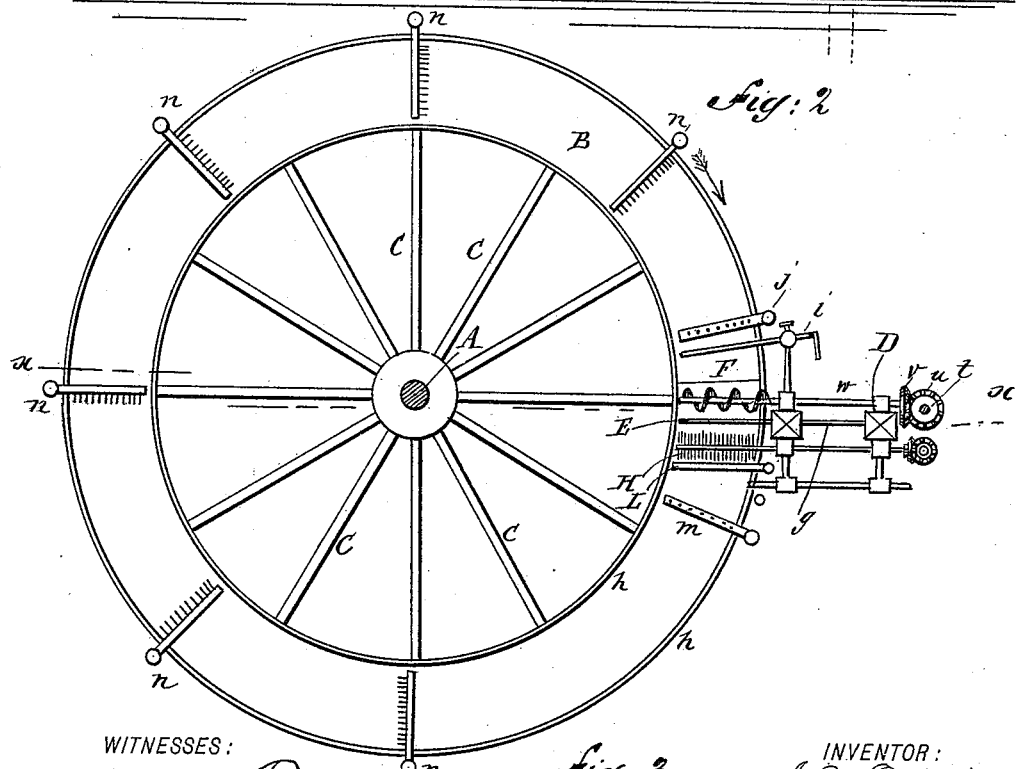
Fig. 2.
Fig. 3.
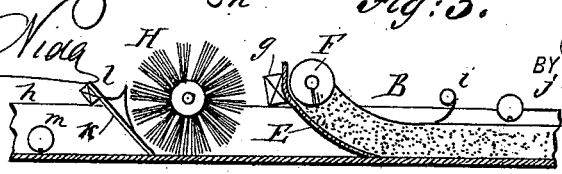
WITNESSES:
INVENTOR:
J. A. Ostenberg
BY Munn & Co.
ATTORNEYS.

UNITED STATES PATENT OFFICE.

JOHN A. OSTENBERG, OF DES MOINES, IOWA.

CONTINUOUS AUTOMATIC STARCH-TABLE.

SPECIFICATION forming part of Letters Patent No. 447,790, dated March 10, 1891.

Application filed October 19, 1889. Serial No. 327,581. (No model.)

*To all whom it may concern:*

Be it known that I, JOHN A. OSTENBERG, of Des Moines, in the county of Polk and State of Iowa, have invented a new and Improved Continuous Automatic Starch-Table, of which the following is a specification, reference being had to the annexed drawings, forming a part thereof, in which—

Figure 1 is a vertical transverse section of my improved continuous automatic starch-table. Fig. 2 is a plan view of the same; and Fig. 3 is an enlarged sectional elevation of the table-cleaning and starch-discharging apparatus, the section being taken on line $z\ z$ in Fig. 2.

Similar letters of reference indicate corresponding parts in all the views.

My invention relates to that class of appliances used in the manufacture of starch to recover the starch from water or alkaline solutions by flotation. Usually this operation is performed upon long shallow gutters, called "starch-tables," having a very slight inclination. The starch mixture being run on the highest end, the starch settles to the bottom, the water and refuse running off at the lower end. When the desired thickness of starch has been attained, the liquid is shut off, the surface of the starch is washed, and the starch is dug out. As the greater part of the starch settles within a comparatively short distance from the supply, it will be seen that if the bottom of the starch-table is adjusted at an inclination to obtain the best result the action of the starch will be to deposit more rapidly near the supply and gradually change the inclination of its surface, so as to render it too steep, the consequence being an unsatisfactory result.

The object of my invention is to render this operation absolutely continuous, thus saving all manual labor and avoiding the inherent difficulties of the old starch-table.

The vertical shaft A, which supports the annular starch-tables B B' B² B³, is provided with a collar $a$, having a bevel face, which rests upon bevel-rollers $b$, supported by the step $c$. The annular tables B B', &c., are supported by arms C, projecting from hubs $d$, secured to the shaft A. Each vertical series of arms C is connected together by a bar $e$. The arms C are further supported by braces $f$. At one side of the series of annular tables is arranged a frame D for supporting the starch-discharging and starch-supplying apparatus. As the apparatus is the same for each table, a description of one set will be sufficient.

To an arm $g$, secured to the frame D, is attached a scoop E, which extends down in an oblique direction to the bottom of the annular table B. Each annular table is provided upon its inner and outer edges with vertical flanges $h$ for confining the liquid delivered to the table. Above the scoop E is arranged a worm-conveyer F for transferring the starch forced upward upon the scoop to a chute G, which conveys it away from the machine. In front of the scoop E is arranged a flexible rubber scraper $i$, which rests upon the body of starch being carried forward by the table, scraping off any adherent gluten, and in front of said flexible scraper is arranged a perforated tube $j$, through which the liquid is supplied to the table.

Behind the scoop E is arranged a rotary scraping-brush H, supplied with fresh water for cleaning the table B. Behind the brush H is arranged a scraper $k$, provided with a soft-rubber lining to prevent the wash-water from passing to exhaust-pipe $m$. The scraper is furnished with a gutter $l$ for receiving the water and starch carried up by the brush H. Behind the scraper $k$ is arranged a perforated pipe $m$ to carry away the refuse liquid by suction. At several points in the circumference of the table B are arranged stationary brushes or sweeps $n$ for sweeping the surface of the starch on the table.

The lower table B³ carries a toothed ring $o$, which is engaged by a pinion $p$ on the horizontal shaft $q$. The horizontal shaft $q$ is provided with a bevel-wheel $r$, which engages a bevel-wheel $s$ on the vertical shaft $t$, and upon the said vertical shaft are placed bevel-wheels $u$, which engage pinions $v$ on the shafts $w$ of the conveyers F.

The operation of my improved table is as follows: The starch mixture flows onto the table through the pipe $j$, forming a thin sheet, which travels slowly around the gutter in a direction opposite to that of the motion of the table, the starch settling while the table revolves in the direction indicated by the arrow, forming a gradually-increasing thickness of starch. When the starch arrives at the scoop E, it is carried upward to the conveyer F by the forward motion of the starch-table, as shown in Fig. 3. The flexible scraper $i$ cleans the surface from any adherent water and gluten. The sweeps $n$, arranged around the circumference of the table, brush the surface of the starch as it passes forward, thus preventing the gluten and fibrine from settling with the starch. The starch-table being level, the necessary pitch to produce the flow of the liquid is furnished by the starch itself as it revolves against the direction of the flow. The table passing the pipe $j$ receives a deposit, which gradually decreases in thickness toward the pipe $m$, at which point there is little starch or none at all. The density of the liquid, the volume of the flow, and the speed of the revolution of the starch-table remaining constant, the pitch of the surface of the starch on the table remains constant; but by varying these conditions the pitch of the starch may be varied.

Having thus described my invention, I claim as new and desire to secure by Letters Patent—

1. In a continuous automatic starch-table, the combination, with an annular table furnished with raised edges or lips, of a tube for supplying the starch liquid to the table, a scoop for lifting the starch from the table, a conveyer for removing the starch lifted by the scoop, and a discharge-pipe for removing the water which has been discharged of starch, substantially as specified.

2. In a continuous automatic starch-table, the combination, with an annular table, of a pipe for supplying the starch liquid, a series of brushes for sweeping the surface of the starch, a scoop for lifting the starch from the table, a conveyer for removing the starch from the scoop, a flexible scraper for cleaning the surface of the starch, and a pipe for removing the water which has been discharged of starch, substantially as specified.

3. The combination, with the annular table B and scoop E, of the brush H and the scraper $k$, provided with the gutter $l$ for cleaning the table, substantially as specified.

4. In a continuous starch-table, the combination of the table B, provided with raised edges, the supply-pipe $j$, the sweeps $n$, scoop E, the flexible scraper $i$, the conveyer F, the suction discharge-pipe $m$, and mechanism, substantially as described, for operating the table and the conveyer, as specified.

5. In a continuous starch-table, the combination of the table B, provided with raised edges, the supply-pipe $j$, the sweeps $n$, scoop E, the flexible scraper $i$, the conveyer F, the suction discharge-pipe $m$, mechanism, substantially as described, for operating the table, the brush H, and scraper $k$, provided with the gutter $l$, as specified.

6. The herein-described method of forming starch, which consists in discharging a thin stream of starch liquor continuously upon the table and simultaneously moving the settled starch slowly forward in a direction opposite the flow of the liquor to preserve the even thickness of the layer at its forward end, then forcing the forward end of the layer upward from the table and removing it therefrom, substantially as described.

7. The herein-described method of forming starch, which consists in discharging a thin stream of starch liquor continuously upon the table and simultaneously moving the starch slowly forward in a direction opposite the flow of the liquor to preserve the even thickness of the layer at its forward end, then forcing the forward end of the layer upward from the table and removing it and also simultaneously withdrawing the waste liquor from the table at the opposite or thin end of the starch-layer, substantially as described.

8. The herein-described method of forming starch, which consists in discharging a stream of starch liquor upon the table and simultaneously moving the settled starch slowly forward in a direction opposite the flow of the liquor to preserve the even thickness of the layer at its forward end, then cleaning the surface of the layer, then forcing its forward end upward from the table and removing it continuously therefrom, and finally withdrawing the waste liquor from the table at the rear or thin end of the layer, substantially as described.

JOHN A. OSTENBERG.

Witnesses:
WM. M. NEWELL,
JOHN G. O'BRIEN.